United States Patent
Mechanic

(10) Patent No.: US 6,229,682 B1
(45) Date of Patent: *May 8, 2001

(54) TRANSIENT VOLTAGE SURGE SUPPRESSOR

(75) Inventor: Bahram Mechanic, Houston, TX (US)

(73) Assignee: IEPS Electronic, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/311,240

(22) Filed: May 13, 1999

(51) Int. Cl.$^7$ ...................................................... H02H 9/00
(52) U.S. Cl. ........................... 361/111; 361/56; 361/91.1; 361/118
(58) Field of Search ............................... 361/56, 82, 91.1, 361/111, 113, 118, 127

(56) References Cited

U.S. PATENT DOCUMENTS 5,721,661 * 2/1998 Mechanic ............................ 361/118
6,040,969 * 3/2000 Winch et al. ......................... 361/82

* cited by examiner

Primary Examiner—Stephen W. Jackson
(74) Attorney, Agent, or Firm—Bracewell & Patterson, LLP

(57) ABSTRACT

A transient voltage surge suppressor is provided to protect equipment with voltage sensitive electronics, such as office equipment, from surges or transients in the multi-phase power distribution network furnishing power. The surge suppressor senses the incoming voltage and electrically disconnects its output to the office equipment if a voltage surge above an established level is sensed. The suppressor also disconnects its output when a ground connection in the multi-phase power network is disconnected to protect the equipment against excessive voltages. In this situation, the suppressor circuit protects its internal components from damage and possible fire hazard when its output is disabled, so that the suppressor can resume its function when conditions in the power distribution network return to a satisfactory state.

19 Claims, 1 Drawing Sheet

TRANSIENT VOLTAGE SURGE SUPPRESSOR

BACKGROUND OF INVENTION

1. Field of the Invention

The present invention relates to electrical protective filters or transient voltage surge suppressors (TVSS) for office equipment or any microprocessor-based equipment. These suppressors provide surge filtration to protect the office equipment from surges or transients in the power furnished from the power distribution network.

2. Description of the Prior Art

Numerous types of office equipment used in recent years contain electronic chips or components which are sensitive to voltage surges or transients in the power distribution network provided by utility companies. Examples of such types of office equipment include computers, facsimile machines, photocopiers and the like. Devices known as power filters or transient voltage surge suppressors have been developed to protect these types of office equipment from such power surges or transients. U.S. Pat. No. 5,721,661, of which applicant is inventor, is one form of such a power filter.

Office buildings and other places where such equipment has been used have often been based on a three-phase or center-tap system of power distribution. There are several advantages from the use of this form of power. It allows more power to be delivered to a site, is more easily distributed, and allows two voltage levels (such as 120 volts and 240 volts) to be delivered. Customers can thus use equipment requiring larger amounts of power. These forms of power are a more cost effective way for an electric utility to transmit power to an end user. In three phase or center tap power, in the event of loss of the ground wire or neutral wire connection in the distribution grid, voltage levels provided in the network could increase up to a double level. This is not an uncommon event. Equipment rated at 120 volts could thus be subjected to up to 240 volts. So it could possibly burn out a surge protection component and possibly cause firing the TVSS unit, which could also burn out the connected equipment.

So far as is known, it was typical to use relatively inexpensive thermal fuses for protective purposes in these situations. These fuses would typically open after response to excess heat for periods of from a couple of seconds to several minutes. It may protect the TVSS against firing after burn out, but sensitive electronic chips and circuits of connected equipment were not capable of withstanding such excessive voltage levels for even short fractions of a second, such as a few milliseconds.

SUMMARY OF INVENTION

Briefly, the present invention provides a new and improved protective circuit for electrical apparatus. The protective circuit has hot, neutral and ground leads which are arranged to be placed between corresponding hot, neutral and ground leads of the electrical circuit. The protective circuit includes a voltage surge protection and filtration circuit connected between the hot and neutral leads, also between neutral and ground, and also between the hot lead and ground.

The voltage surge protection circuit has first and second voltage surge protectors connected in an electrical series relationship with each other. The first and second voltage surge protectors are connected at a common connection or node to each other. If desired, a second set of first and second voltage surge protectors, similarly connected to each other and connected to the first set through a noise isolation transformer or differential transformer may be included.

The protective circuit also includes a series-connected set of first and second relays connected between the hot and neutral leads of the protective circuit. The first relay has a switch arm to connect the clamping device, such as an MOV gas tube, Zener or any other type of voltage clamping component, also to connect a filtration component such as capacitor or inductor between the neutral lead and ground lead to suppress and filter the neutral ground (common mode) noises and spikes when the first relay is receiving current. The first relay is typically receiving current when the ground lead is properly connected to ground, also the hot and neutral leads are correctly connected to hot and neutral, not reverse polarity.

The first relay switch arm opens when current in the first relay circuit is not being received or present, such as when the ground connection of the ground lead is interrupted or broken. The protective circuit of the present invention thus protects the voltage surge protectors and filtration components such as MOV's and capacitors and any type of voltage protector devices (such as a gas-tube, ZENER or the like) between neutral and ground or hot to ground in the voltage surge protector circuit. Protection is provided against over voltage (240 V) when connection to an electrical ground is broken or reverse polarity of hot and neutral, causing a voltage increase up to 240 V.

The second relay of the protective circuit also controls a switch arm which is located in a conductor connecting the hot lead of the power utility outlet to the hot lead of the electrical apparatus when the second relay is receiving current. The second relay switch arm opens when current in the second relay is not present, such as when the ground connection of the ground lead is interrupted or a reverse polarity of hot and neutral or when the voltage increases up to 240 V.

The protective circuit of the present invention also protects all components between hot and neutral and thus protects the electrical apparatus when ground connection to electrical ground is broken or interrupted. Protection occurs against reverse polarity of hot and neutral or when voltage increases up to 240 V, and also in the event of applying 240 volts to hot and neutral without ground connection.

The protective circuit of the present invention also includes a voltage threshold sensing circuit which detects when the voltage between the hot and neutral lead of the power utility outlet exceeds an established protective level. An electronic switch is connected to the voltage threshold sensing circuit. The electronic switch responds to power from the utility outlet detected as exceeding the threshold and disables the second relay which supplies current to the connected apparatus or microprocessor-based equipment. The electrical apparatus is thus protected by the circuit of the present invention from excess voltage levels between the hot and neutral lead from the power utility outlet. An indicator, such as an LED, also turns on to indicate the abnormality of voltage.

DESCRIPTION OF THE PREFERRED EMBODIMENT

Figure 1:
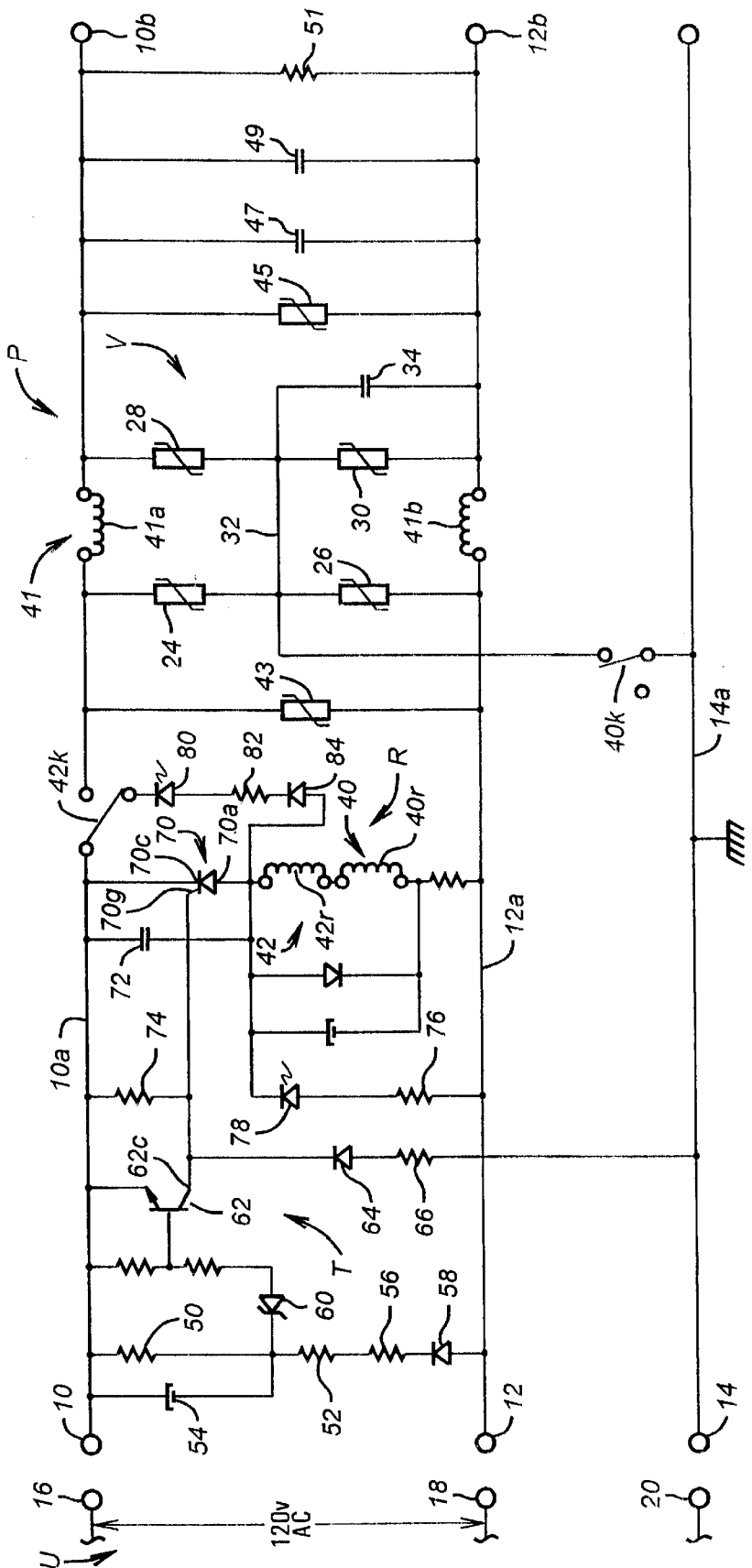
FIG. 1 is a schematic electrical circuit diagram of a transient voltage surge suppressor or transformer base filter according to the present invention.

In the drawings, the letter P designates generally a new and improved protective circuit or transient voltage suppressor for electrical apparatus. The protective circuit P functions as a transformer base filter. In the preferred embodiment, the electrical apparatus may take the form of a computer, a copier, a facsimile machine or the like having voltage surge or transient sensitive electronic components, such as computer chips. These types of components are sensitive to voltage surges or transients, as well as abnormal high voltages furnished them by leads from electrical power utilities. It should be understood, however, that the protective circuit P may be used with other electrical apparatus which are sensitive to voltage surges or transients, or to abnormal high voltage.

The protective or transformer-based filter circuit P has as its inputs a hot lead or terminal 10, a neutral lead 12, and ground lead 14, each of which is connected respectively to a hot lead 16, a neutral lead 18 and a ground lead 20 of a conventional electrical power utility outlet U. Typically, the embodiment shown in the power provided is conventional 120 volts alternating current potential difference between the hot lead 16 and the neutral lead 18. It should be understood that the voltage level present could be some other conventional or standard voltage level.

The protective circuit P includes a voltage surge protective circuit V connected between a hot conductor 10a connected to the hot terminal 10 and neutral conductor 12a connected to the neutral lead 12. The voltage surge protective circuit V has a first set of voltage surge protective devices or clamping devices 24 and 26 and a second set of voltage surge protective devices, such as filters or clamps 28 and 30 and also a capacitor 34. Each of the two sets of voltage surge protective devices is connected in an electrical series circuit between the hot and neutral leads 10 and 12.

The series connected clamping devices 24 and 26 of the first set are connected at a node or common connection 32 to each other opposite their respective connections to the hot and neutral leads 10 and 12. Similarly, the series connected clamping devices 28 and 30 of the second set of the circuit V and also the capacitor 34 are connected to each other at the node 32 and thus to the clamping devices 24 and 26 of the first set. The node 32 is connected to the neutral lead 12 through a noise filter capacitor 34. The noise filter capacitor 34 may be any rating or capacitance value, such as 2 $\mu$f or larger.

The protective circuit P also includes a relay circuit R composed of a set of a first relay 40 and a second relay 42 connected between the hot and neutral leads 10 and 12.

As will be set forth, the relay set R protects against several undesirable conditions. The first relay 40 protects voltage surge protective devices 24, 26, 28, and 30, and capacitor 34 when ground lead 14 is not connected to building ground 20. The first relay 40 also protects these voltage surge protective devices against high voltages between hot lead 10 and ground lead 14, and also high voltages between neutral lead 12 and ground lead 14.

In addition, the second relay 42 protects voltage surge protective devices 43 and 45 between hot lead 10 and neutral lead 12 against high voltages. The second relay 42 as well protects the electrical apparatus at the output of protective circuit P against high voltages.

The first relay 40 has a relay coil 40r controlling the position of a switch arm or contact 40k. The contact 40k of the relay 40 is electrically connected between the node 32 between the voltage surge protective clamp sets 24 and 26, and 28 and 30 in an electrical circuit path or conductor 44 to a ground conductor 14a connected to the electric ground terminal 14. As long as the electric ground 14a is electrically connected to ground, and also, as long as the connection between the hot and neutral leads 10 and 12 is not reversed, the relay 40 receives current and relay contact 40k is in a closed position shown in the drawing.

When the ground wire 14a is properly connected and the hot and neutral wires are also properly connected, then a thyristor 70 is on. The relays 40 turns on and first relay arm 40k closes the circuit between the ground lead 14a and node 32. In this manner any power surges or transients between ground and neutral or hot are suppressed by the voltage protective devices 24 and 26, also by devices 28 and 30 when present. Further, noise and transients also are filtered by capacitor 34. In this manner, substantially all electrical noise which may from time to time appear between the hot or neutral leads 10 or 12 and ground is filtered.

In the event an electrical connection between the ground lead 14 and building ground 20 is interrupted, or if the connection between the hot lead 10 and neutral lead 12 should become reversed, an abnormal situation is present. The voltage levels present can increase to twice their normal level. The relay 40 no longer receives current through thyristor 70 or other electronic switch, such as a transistor. In such a case, the contact 40k of the relay 40 opens and current cannot flow through voltage clamping devices 24, 26, 28 and 30 or the noise filter capacitor 34. Thus, the clamping components of the voltage surge protection circuit V are protected from increased voltage.

Winding bobbins 41a and 41b of a differential transformer (or noise isolation transformer) 41 are series connected between hot lead 10a and 10b and between neutral 12a and 12b, respectively. The noise isolation transformer 41 combines with capacitor 34 to filter the noise between the hot and ground or neutral lead and ground 20.

A voltage clamping device 43 is provided to suppress any surges or transient between hot lead 10a and neutral lead 12a and a clamping device 45 suppresses any surges and transients between hot lead 10b and neutral lead 12b. Capacitors 47 and 49 are furnished for filtering any noise between hot lead 10b and neutral lead 12b while a resistor 51 discharges the capacitors 47 and 49.

The second relay 42 of the relay circuit R includes a coil 42r which controls a switch arm or contact 42k in hot conductor 10a connecting the hot lead 16 of the electrical power utility outlet U to a hot lead output 10b connected to the electrical apparatus. So long as the relay 42 is receiving electrical current, the contact 42k is closed and electrical power is furnished at the hot lead output 10b to the electrical apparatus. In the event that current through the relay 42 is no longer present, such as when the ground connection is interrupted, or polarity between the hot lead 10 and neutral lead 12 becomes reversed, the contact 42k of the relay 42 opens. Power is thus inhibited from being present at hot lead 10b, and the electrical apparatus connected there is protected from voltage surges or transients. Also any clamping components between hot lead 10b and neutral lead 12b are protected against increased voltage.

The protective circuit P of the present invention also includes a voltage threshold sensing circuit T which detects when the voltage on the hot lead 16 of the electrical power utility outlet U exceeds a set or established voltage threshold. The voltage threshold is established by the relative impedance values of series connective resistors 50 and 52. The voltage threshold may be adjusted by selecting different impedance values for the two resistors, or by including a variable resistor or rheostat in one or both of the resistors 50 or 52. A DC filter capacitor 54 is connected in parallel with the resistor 50. The resistor 52 is electrically connected to the neutral conductor 12a and neutral lead 12 by a resistor 56. A diode 58 is present to rectify the AC voltage to DC.

A Zener diode 60 is electrically connected to resistors 50 and 52 to sense the voltage threshold level present there. As long as the voltage threshold does not exceed the established threshold, the diode 60 does not conduct. In the event that the voltage threshold level provided to diode 60 exceeds the set level, diode 60 begins to conduct and a transistor or other electrical or electronic switch 62 also begins to conduct. The transistor 62 is normally held in a non-conductive state by a diode 64 and a resistor 66.

A collector terminal 62c of the transistor 62 is connected to a gate 70g of a thyristor 70, or other suitable electronic switch, such as a transistor, connected in series with the relays 40 and 42. When the transistor 62 begins to conduct due to the threshold voltage level being exceeded, the current between the gate 70g and a cathode 70c of the thyristor 70 is drawn to zero. Thyristor 70 is then switched to a non-conductive or off state and current flow through relays 40 and 42 is terminated. In this manner, relays 40 and 42 of the voltage surge protective circuit V are disabled in the event of excess voltage between hot lead 16 and neutral lead 18, protecting the circuit P and connected apparatus from excessive input voltage.

Thyristor 70 is normally biased to a conductive state and provides electrical current to relays 40 and 42 by a bias network including a capacitor 72 and resistors 74 and 76. An indicator, such as a light-emitting-diode (LED) 78, is provided in the bias network to indicate when the thyristor 70 is conductive and thus relays 40 and 42 are receiving current. An alarm indicator 80, such as an LED, is connected through a resistor 82 and a diode 84 to an anode 70a of the thyristor 70. In the event that contact 42k of relay 42 interrupts the flow of power to the electrical apparatus via the hot conductor 10a, indicator 80 is electrically energized to indicate this alarm condition.

It should be understood also that the relays 40 and 42 may be separately connected individually between the hot lead 10a and neutral lead 12a, rather than in series as shown in the drawing. In this separate connection, each of the relays 40 and 42 are provided with a separate thyristor or other electronic switch functioning like the thyristor 70. Each such separate thyristor or electronic switch is of course provided with its own corresponding bias network of the type described above.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A protective circuit having hot, neutral, and ground leads arranged to be placed between corresponding hot, neutral, and ground leads of a power utility outlet and corresponding hot, neutral, and ground leads of electrical apparatus, said protective circuit comprising:

a voltage surge protection circuit connected between the hot and neutral leads, comprising:
first and second voltage surge protectors connected in series between the hot and neutral leads,
said first and second voltage surge protectors being connected at a common connection to each other;

a first relay connected between the hot and neutral leads of the protective circuit and controlling a first relay switch arm which connects the common connection of the first and second voltage surge protectors to an electrical path to ground when the first relay is receiving current, said first relay receiving current when the ground lead is connected to an electrical ground, and said first relay switch arm opening when current in the first relay circuit is not received to protect the voltage surge protectors of the voltage surge protector circuit when the ground lead is not connected to an electrical ground.

2. The protective circuit of claim 1, further including:
a capacitor connected between said common connection of said first and second voltage protectors in said voltage surge protection circuit and said neutral lead, said capacitor having a farad rating to filter substantially all noise signals on said neutral lead to ground when said ground lead of said circuit is connected to electrical ground through said first relay switch arm.

3. The protective circuit of claim 2, further including:
a voltage threshold sensing circuit for detecting when the voltage on the hot lead of the power utility outlet exceeds an established protective level;
a relay supply switch for providing current to the relay circuit; and
an electronic switch responsive to the voltage threshold sensing circuit for disabling the relay supply switch and protecting the electrical apparatus when the voltage between the hot lead and the neutral lead of the power utility outlet exceeds an established protective level.

4. The protective circuit of claim 1, further including:
a voltage threshold sensing circuit for detecting when the voltage between the hot lead and the neutral lead of the power utility outlet exceeds an established protective level;
a relay supply switch for providing current to the relay circuit; and
an electronic switch responsive to the voltage threshold sensing circuit for disabling the relay supply switch and protecting the electrical apparatus when the voltage between the hot lead and the neutral lead of the power utility outlet exceeds an established protective level.

5. The protective circuit of claim 1, further including:
a voltage threshold sensing circuit for detecting when the voltage on the hot lead of the power utility outlet exceeds an established protective level;
a relay supply switch for providing current to the relay circuit;
an electronic switch responsive to the voltage threshold sensing circuit for disabling the relay supply switch and protecting the electrical apparatus when the connection between the ground lead is disconnected.

6. The protective circuit of claim 1, further including:
a voltage threshold sensing circuit for detecting when the voltage on the hot lead of the power utility outlet exceeds an established protective level;
a relay supply switch for providing current to the relay circuit;
an electronic switch responsive to the voltage threshold sensing circuit for disabling the relay supply switch and protecting the electrical apparatus when the connection between the hot and neutral lead is reversed.

7. The protective circuit of claim 1, wherein:
said first relay receives current when the hot lead and the neutral lead are properly connected and not receiving current when the connection between the hot lead and the neutral lead is reversed, said first relay switch arm opening when current in the first relay circuit is not received to protect the voltage surge protectors of the voltage surge protector circuit when the connection between the hot lead and the neutral lead is reversed.

8. The protective circuit of claim 1, further including:
a second relay connected between the hot and neutral leads of the protective circuit and controlling a second relay switch arm in a conductor connecting the hot lead of the power utility outlet to the hot lead of the electrical apparatus when the second relay is receiving current, said second relay receiving current when the ground lead is connected to an electrical ground, said second relay switch arm opening when current in the second relay circuit is not received to protect the electrical apparatus and the voltage surge protectors of the voltage surge protector circuit when the ground lead is not connected to an electrical ground.

9. The protective circuit of claim 1, further including:
a second relay connected between the hot and neutral leads of the protective circuit and controlling a second relay switch arm in a conductor connecting the hot lead of the power utility outlet to the hot lead of the electrical apparatus when the second relay is receiving current, said second relay receiving current when the hot lead and the neutral lead are properly connected and not receiving current when connection between the hot lead and the neutral lead is reversed, said second relay switch arm opening when current in the second relay is not received to protect the electrical apparatus and the voltage surge protectors of the voltage surge protector circuit when connection between the hot lead and the neutral lead is reversed.

10. A protective circuit having hot, neutral, and ground leads arranged to be placed between corresponding hot, neutral, and ground leads of a power utility outlet and corresponding hot, neutral, and ground leads of electrical apparatus, said protective circuit comprising:
a voltage surge protection circuit connected between the hot and neutral leads, comprising:
first and second voltage surge protectors connected in series between the hot and neutral leads,
said first and second voltage surge protectors being connected at a common connection to each other;
a first relay connected between the hot and neutral leads of the protective circuit and controlling a first relay switch arm which connects the common connection of the first and second voltage surge protectors to an electrical path to ground when the first relay is receiving current, said first relay receiving current when the hot lead and the neutral lead are properly connected and not receiving current when connection between the hot lead and the neutral lead is reversed, said first relay switch arm opening when current in the first relay circuit is not received to protect the voltage surge protectors of the voltage surge protector circuit when the connection between the hot lead and the neutral lead is reversed.

11. A protective circuit having hot, neutral, and ground leads arranged to be placed between corresponding hot, neutral, and ground leads of a power utility outlet and corresponding hot, neutral, and ground leads of electrical apparatus, said protective circuit comprising:
a voltage surge protection circuit connected between the hot and neutral leads, comprising:
first and second voltage surge protectors connected in series between the hot and neutral leads,
said first and second voltage surge protectors being connected at a common connection to each other;
a relay connected between the hot and neutral leads of the protective circuit, said relay controlling a relay switch arm in a conductor connecting the hot lead of the power utility outlet to the hot lead of the electrical apparatus when the relay is receiving current, said relay receiving current when the ground lead is connected to an electrical ground, said relay switch arm opening when current is not received to protect the electrical apparatus and the voltage surge protectors of the voltage surge protector circuit when the ground lead is not connected to an electrical ground.

12. The protective circuit of claim 11, further including:
a voltage threshold sensing circuit for detecting when the voltage between the hot lead and neutral lead of the power utility outlet exceeds an established protective level;
a relay supply switch for providing current to the relay circuit; and
an electronic switch responsive to the voltage threshold sensing circuit for disabling the relay supply switch and protecting the electrical apparatus and surge protector components between hot and neutral leads when the voltage on the hot lead of the power utility outlet exceeds an established protective level.

13. A protective circuit having hot, neutral, and ground leads arranged to be placed between corresponding hot, neutral, and ground leads of a power utility outlet and corresponding hot, neutral, and ground leads of electrical apparatus, said protective circuit comprising:
a voltage surge protection circuit connected between the hot and neutral leads, comprising:
first and second voltage surge protectors connected in series between the hot and neutral leads,
said first and second voltage surge protectors being connected at a common connection to each other:
a relay connected between the hot and neutral leads of the protective circuit and controlling a relay switch arm in a conductor connecting the hot lead of the power utility outlet to the hot lead of the electrical apparatus when the relay is receiving current, said relay receiving current when the hot lead and the neutral lead are properly connected and not receiving current when connection between the hot lead and the neutral lead is reversed, said relay switch arm opening when current in the relay is not received to protect the electrical apparatus and the voltage surge protectors of the voltage surge protector circuit when the connection between the hot lead and the neutral lead is reversed.

14. A protective circuit having hot, neutral, and ground leads arranged to be placed between corresponding hot, neutral, and ground leads of a power utility outlet and corresponding hot, neutral, and ground leads of electrical apparatus, said protective circuit comprising:
a voltage threshold sensing circuit for detecting when the voltage on the hot lead of the power utility outlet exceeds an established protective level;
a voltage surge protection circuit connected between the leads to protect the electrical apparatus from voltage surges;
a relay circuit to protect the voltage surge protection circuit;
a relay supply switch for providing current to the relay circuit; and an electronic switch responsive to the voltage threshold sensing circuit for disabling the relay supply switch and protecting the electrical apparatus when the voltage on the hot lead of the power utility outlet exceeds an established protective level.

15. The protective circuit of claim 14, wherein the voltage surge protection circuit is connected between the hot and neutral leads.

16. The protective circuit of claim 15, wherein the voltage surge protection circuit comprises:

first and second voltage surge protectors connected in series between the hot and neutral leads;

said first and second voltage surge protectors being connected at a common connection to each other.

17. The protective circuit of claim 16, further including:

a series connected set of first and second relays connected between the hot and neutral leads of the protective circuit, said first relay controlling a first relay switch arm which connects the common connection of the first and second voltage surge protectors to an electrical path to ground when the first relay is receiving current, said first relay receiving current when the ground lead is connected to an electrical ground, and said first relay switch arm opening when current in the first relay circuit is not received to protect the voltage surge protectors of the voltage surge protector circuit when the ground lead is not connected to an electrical ground.

18. The protective circuit of claim 17, further including:

a capacitor connected between said common connection of said first and second voltage protectors in said voltage surge protection circuit and said neutral lead, said capacitor having a farad rating to filter substantially all noise signals on said neutral lead to ground when said ground lead of said circuit is connected to electrical ground through said first relay switch arm.

19. The protective circuit of claim 17, further including:

said second relay controlling a second relay switch arm in a conductor connecting the hot lead of the power utility outlet to the hot lead of the electrical apparatus when the second relay is receiving current, said second relay receiving current when the ground lead is connected to an electrical ground, said second relay switch arm opening when current in the first relay circuit is not received to protect the electrical apparatus surge protector components and circuit when the ground lead is not connected to an electrical ground.

* * * * *